US008343655B2

United States Patent
Zhang et al.

(10) Patent No.: US 8,343,655 B2
(45) Date of Patent: Jan. 1, 2013

(54) GEL POLYMER LI-ION BATTERY ELECTRODE SLICE AND PREPARING METHOD THEREOF

(75) Inventors: Xin Zhang, Xiamen (CN); Yanchuan Guo, Beijing (CN); Haitao Xu, Beijing (CN); Qiangli Gao, Dalian (CN); Rongfu Li, Xiamen (CN); Ying Cui, Xiamen (CN); Yuanfen Hu, Guangdong Province (CN); Keli Chen, Yunna Province (CN)

(73) Assignee: Zhang Xin, Xiamen (CN)

( * ) Notice: Subject to any disclaimer, the term of this patent is extended or adjusted under 35 U.S.C. 154(b) by 353 days.

(21) Appl. No.: 12/720,298

(22) Filed: Mar. 9, 2010

(65) Prior Publication Data
US 2010/0304221 A1      Dec. 2, 2010

(30) Foreign Application Priority Data

May 26, 2009   (CN) .......................... 2009 1 0143465

(51) Int. Cl.
*H01M 4/02*   (2006.01)
*H01M 4/13*   (2010.01)
(52) U.S. Cl. ......... 429/209; 429/212; 429/217; 429/232
(58) Field of Classification Search ............... 427/58, 427/177, 178, 179, 207.1; 401/5, 44, 139, 401/208, 219, 220; 429/209, 212, 217, 218.1, 429/232
See application file for complete search history.

(56) References Cited

U.S. PATENT DOCUMENTS
2005/0175903 A1    8/2005  Kim et al.

FOREIGN PATENT DOCUMENTS
CN            1591934 A        3/2005

*Primary Examiner* — Jennifer Michener
*Assistant Examiner* — Heng Chan
(74) *Attorney, Agent, or Firm* — Birch, Stewart, Kolasch & Birch, LLP

(57) ABSTRACT

The present invention relates to a gel polymer Li-ion battery electrode slice and a method for preparing the same. The electrode slice comprises a two-layer composite structure of electrode active material/gel electrolyte or a three-layer composite structure of electrode active material/gel electrolyte/ electrode active material. The method includes preparation and filtration of gel polymer Li-ion battery electrode slurry and gel polymer electrolyte slurry and a multi-layer one-step coating process, and includes the following steps: a) grinding an electrode active material, and adding an adhesive, a surfactant, a dispersant thereto to obtain a raw slurry of the electrode active material; b) filtering the raw slurry of the electrode active material to obtain a uniform, fine precoating slurry; c) dispersing a monomer, a curing agent of the gel electrolyte and a polymer Li battery electrolyte into a solvent, and filtering the resultant dispersion to obtain a precoating gel electrolyte slurry; and d) coating directly the precoating slurries obtained in steps b) and c) on a composite film of current collector and polyester by a multi-layer one-step coating process to obtain a battery electrode slice of a two-layer composite structure of electrode active material/gel electrolyte or of a three-layer composite structure of electrode active material/gel electrolyte/electrode active material.

14 Claims, 1 Drawing Sheet

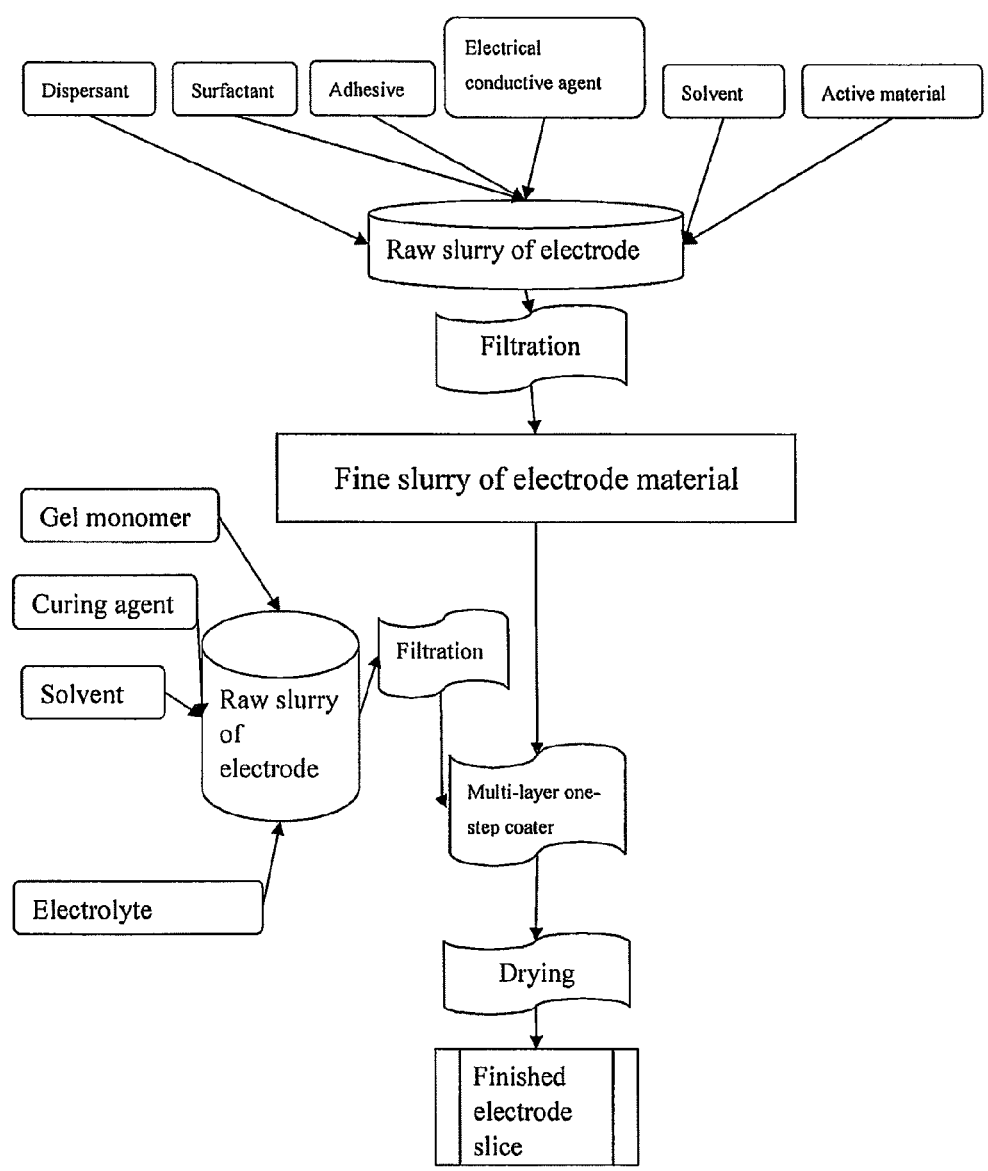

GEL POLYMER LI-ION BATTERY ELECTRODE SLICE AND PREPARING METHOD THEREOF

TECHNICAL FIELD

The present invention relates to a method for preparing a new gel polymer Li-ion battery electrode slice by a multi-layer one-step coating technology.

BACKGROUND ART

The producing technology of polymer Li-ion batteries was firstly disclosed by Bellcore, and the producing procedure includes preparation and assembly of positive electrode slice and negative electrode slice, and preparation of polymer electrolyte film. The process of preparation comprises the following steps: coating a punched aluminum foil and copper foil with positive electrode and negative electrode slurries, then inserting a polymer film or a gel electrolyte between the positive electrode and the negative electrode to isolate the positive electrode from the negative electrode; and after cutting positive electrode and negative electrode films, laminating and hot-pressing them to obtain battery cells. This process contains some troublesome steps, the cells obtained have bad uniformity and the rate of finished products is low. And as a result of the large thicknesses of the electrodes, the utilization rate of the electrode materials is low and the production cost is high.

Chinese Patent Application No. 200810060861.3, filed by Wanxiang Group Company, describes a process for preparing a polymer lithium battery substrate by a single-layer coating method using blade coating, but the coating thickness thereof is not specified. Chinese Patent Application No. 200810060860.9 describes a process for preparing a electrode coating by using spray coating, in which the coating uniformity of said process is, however, relatively low, and it is hard to control the thickness. Chinese Patent No. 00817741.4, owned by Sanyo Electric Corporation Ltd., describes a method for producing a battery current collector by a thin film deposition process, in which said collector can be made into an alloy with Li, and the alloy electrode has a good electrical conductivity. However, the deposition process needs a thermal treatment at a high temperature and the operating procedures are complicated and unfeasible for industrial production. Chinese Patent No. 200510002144.1, owned by BYD Company Ltd., introduces a method of preparing a electrode coating of lithium battery, which comprises steps of slurrying, rolling, slitting and cutting, but the patent does not describe any specific coating process and coating thickness. Chinese Patent Application No. 200580027720.6, filed by Japanese Central Research Institute of Electric Power Industry, introduces a method of producing a positive electrode slice for organic electrolyte lithium battery, but it does not indicate which coating preparation technology is applied.

According to the present invention, a method of preparing a new gel polymer Li-ion battery electrode coating by a multi-layer one-step coating technology is used, in which a positive electrode active material slurry, a gel polymer electrolyte slurry and a negative electrode active material slurry of the battery are coated with a high speed coater by a three-layer one-step coating technology to directly obtain a battery electrode coating of a two-layer composite structure of electrode active material/gel electrolyte or a three-layer composite structure of electrode active material/gel electrolyte/electrode active material. The method is originally creative and has never been reported in relevant patents and references.

SUMMARY OF THE INVENTION

The first object of the present invention is to provide a gel polymer Li-ion battery electrode slice. Another object of the present invention is to provide a method of preparing the gel polymer Li-ion battery electrode slice, which comprises steps of preparation and filtration of slurries and multi-layer one-step coating and so on.

In a first aspect, the gel polymer Li-ion battery electrode slice of the present invention comprises a two-layer composite structure of electrode active material/gel electrolyte or a three-layer composite structure of electrode active material/gel electrolyte/electrode active material. The electrode active material may comprise an adhesive, a surfactant, a dispersant, an electrical conductive agent and a solvent for Li-ion electrode material. The adhesive can be one selected from polyurethane, polytetrafluoroethylene and polyvinylidene fluoride, or a mixture thereof. The surfactant may be one selected from sodium 4,5-dibutyl naphthalene sulphonate, sodium di-iso-octyl sulfosuccinate, sodium dodecyl sulphonate and sodium lauryl benzene sulphonate, or a mixture thereof. The dispersant may be one selected from ethanol, propanol, butanol and tetrahydrofuran, or a mixture thereof. The gel electrolyte may comprise a gel-polymeric monomer, a curing agent and an electrolyte. The gel-polymeric monomer may be a compound comprising a polar radical functional group(s) C=O, C=N or C—O, such as a polyurethane monomer. The curing agent may be an aldehydic curing agent, such as formaldehyde. The electrolyte may be one or two selected from $LiPF_6$ and $LiClO_4$.

In a second aspect, the method of preparing the gel polymer Li-ion battery electrode slice according to the present invention includes the following steps:

a) grinding an electrode active material, and adding an adhesive, a surfactant, a dispersant, an electrical conductive agent and a solvent for Li-ion battery electrode material thereto to obtain a raw slurry of the electrode active material;

b) filtering the raw slurry of the electrode active material to obtain a uniform, fine precoating slurry;

c) dispersing a monomer, a curing agent and a polymer electrolyte of a gel electrolyte into a solvent, and filtering the resultant dispersion to obtain a precoating gel electrolyte slurry;

d) coating directly the precoating slurries obtained in the steps b) and c) on a composite film of current collector and polyester by a multi-layer one-step coating process to obtain a battery electrode coating of a two-layer composite structure of electrode active material/gel electrolyte or of a three-layer composite structure of electrode active material/gel electrolyte/electrode active material;

e) as to the electrode coating obtained in step d), using an oven or a horizontal channel drier to cure the polymeric monomer and dry the whole battery electrode coating, the temperature being 20-100° C., and the drying time being 10 seconds to 100 minutes.

Wherein, the adhesive in step a) may be one selected from polyurethane, polytetrafluoroethylene and polyvinylidene fluoride, or a mixture thereof. The positive electrode of the electrode active material may be a conventional positive electrode material for those existing polymer Li-ion batteries, and the negative electrode thereof may be a conventional negative electrode material for those existing polymer Li-ion batteries. A conventional electrical conductive agent can be uniformly dispersed in the positive electrode and negative electrode materials, and the proportion thereof may be 0.1-10% based on the total weight of the slurries. The surfactant in step a) may be one selected from sodium 4,5-dibutyl naphthalene sulphonate, sodium di-iso-octyl sulfosuccinate, sodium dodecyl sulphonate and sodium lauryl benzene sulphonate, or a mixture thereof. The dispersant in step a) may be one selected from ethanol, propanol, butanol and tetrahydrofuran. or a mixture thereof. The filtering in step b) may be one selected from pressure filtration, vacuum filtration, centrifugal filtration and polymer filtration, or a combination thereof, and the particle sizes of the solid particles in the slurries after filtering are controlled to 20 nm to 50 μm. The selected gel-polymeric monomer used in step c) may be a compound comprising a polar radical functional group(s) C=O, C=N or C—O. The added polymer electrolyte may be an electrolyte containing a conventional lithium battery lithium salt(s) and a corresponding solvent. The solvents for the slurries used may be conventional solvents for those lithium battery electrode materials. The curing agent may be an aldehydic curing agent, such as formaldehyde curing agent. The coating process used in step d) may be one selected from blade coating, reversal roller coating and extrusion coating, and a multilayer one-step coating process may be applied to prepare the electrode coatings; the coating speed may be 10-150 m/min; and the thickness of the coating may be 3-300 μm. The viscosity of said precoating slurry of electrode active materials in step b) may be 40-5000 centipoises. The viscosity of said precoating slurry of gel polymer electrolyte in step c) may be 50-5000 centipoises.

The electrode slice according to the present invention has a very high uniformity and safety. In the preparation method of the present invention, the electrode active materials of the battery are uniformly dispersed into the solvents for positive electrode and negative electrode and maintain stable for a period, thereby avoiding the agglomeration due to curing before coating. The particle sizes of the active materials contained in the precoating slurries can be precisely controlled by the filtration, thereby avoiding, during coating, resulting in larger particles which may lead to non-uniformity of electrode coating. Meanwhile, the application of the multi-layer one-step coating technology in the preparation of lithium battery cells can allow the battery electrode active slurry/slurries and gel polymer electrolyte slurry to be coated at the same time, which significantly simplifies operational procedures, improves uniformity of products, enhances production efficiency of gel polymer lithium batteries, saves production cost and improves safety of polymer lithium batteries.

A series of these simplified concepts are introduced into the Summary of Invention, which will be further specified in the Best Modes For Carrying Out The Invention. The Summary of the Invention of the present invention does not mean attempting to define the critical features and essential technical features of the claimed technical solutions, nor mean to define the protection scopes of the claimed technical solutions.

BRIEF DESCRIPTION OF THE DRAWINGS

The following figures of the present invention, as a part of the present invention, are used for understanding and interpreting the present invention.

The FIGURE is a flow chart of the method for preparing a gel polymer Li-ion battery electrode according to the present invention.

BEST MODES FOR CARRYING OUT THE INVENTION

In the following description, a lot of specific details are given for providing more thorough understanding of the present invention. However, it is obvious for those skilled in the art that the present invention can be carried out without one or more such details. In order to avoid confusing the invention, some technical features, which are common knowledge in the art, are not illustrated in other examples.

EXAMPLES

Example 1 a) Preparation of lithium battery electrode active material slurry: an electrode active material is ground with a conventional equipment to obtain a segregate electrode active material, and then is added into a solution containing a conventional lithium battery adhesive, which is then stirred to obtain a raw slurry of electrode active material. 5% solution of sodium di-iso-octyl sulfosuccinate as a surfactant is further added in an amount of 0.1% based on the total weight of the electrode active material slurry; and then ethanol as a dispersant is added in an amount of 0.1% based on the total weight of the electrode active material slurry; additionally, an electrical conductive agent is added in an amount of 0.1% based on the total weight of the electrode active material slurry, and after the resultant product is sufficiently agitated to be uniform, a uniform and stable raw slurry dispersed with the electrode active material is obtained;

b) The uniform and stable slurry dispersed with the electrode active material prepared in step a) is pressure-filtered, so as to control the particle sizes of the electrode active material in the slurry thereof to 50 μm or less to obtain a fine slurry, the viscosity thereof being 5000 centipoises;

c) Preparation of gel electrolyte precoating slurry: a polyurethane monomer (gel-polymeric monomer) is dissolved in a solution of tetrahydrofuran to obtain a solution having a concentration of 3% by mass; a formaldehyde curing agent having a concentration of 0.1 mol/L is added; and then an $LiPF_6$ electrolyte solution having a concentration of 1 mol/L is added in an amount of 75% by weight of the polyurethane monomer; after agitating and filtering, a uniform precoating slurry of gel polymer is obtained, the viscosity thereof being 5000 centipoises; and d) The precoating slurries prepared in steps b) and c) are coated onto a surface of a composite film of metal foil current collector and polyester by a two-layer one-step coating process to obtain a two-layer structural coating of the gel electrolyte/the electrode active material. The coating speed is controlled at 10 m/min and the thickness of the coating is controlled at 300 μm. The coating is passed through a horizontal channel drier at 20° C. for 100 minutes, so as to cure and dry the gel polymer electrolyte to obtain a composite electrode coating of the electrode active material and the gel polymer electrolyte.

Example 2 a) Preparation of lithium battery electrode active material slurry: an electrode active material is ground with a conventional equipment to obtain a segregate electrode active material; and then added into a solution containing a conventional lithium battery adhesive, which is then stirred to obtain a raw slurry of electrode active material. 5% solution of sodium dodecyl benzene sulphonate as a surfactant is added in an amount of 0.1% based on the total weight of the electrode active material slurry; and then propanol as a dispersant is added in an amount of 10% based on the total weight of the electrode active material slurry; additionally, an electrical conductive agent is added in an amount of 10% based on the total weight of the electrode active material slurry; and after the resultant product is sufficiently agitated to be uniform, a uniform and stable raw slurry dispersed with the electrode active material is obtained;

b) The uniform and stable slurry dispersed with the electrode active material prepared in step a) is vacuum-filtered, so as to control the particle sizes of the electrode active material in the slurry thereof at 20-200 nm to obtain a fine slurry, the viscosity thereof being 40 centipoises;

c) Preparation of gel electrolyte precoating slurry: a polyurethane monomer (gel-polymeric monomer) is dissolved in a solution of tetrahydrofuran to obtain a solution having a concentration of 3% by mass; a formaldehyde curing agent having a concentration of 0.1 mol/L is added; and then an $LiPF_6$ electrolyte solution having a concentration of 1 mol/L is added in an amount of 75% by weight of the polyurethane monomer; after agitating and filtering, a uniform precoating slurry of gel polymer is obtained, the viscosity thereof being 50 centipoises; and d) The precoating slurries prepared in steps b) and c) are coated onto a surface of a composite film of metal foil current collector and polyester by a two-layer one-step coating process to obtain a two-layer structural coating of the gel electrolyte/the electrode active material. The coating speed is controlled at 150 m/min and the thickness of the coating is controlled at 3 μm. The coating is passed through a horizontal channel drier at 100° C. for 10 seconds, so as to cure and dry the gel polymer electrolyte to obtain a composite electrode coating of the electrode active material and the gel polymer electrolyte.

Example 3 a) Preparation of lithium battery electrode active material slurry: an electrode active material is ground with a conventional equipment to obtain a segregate electrode active material; and then is added into a solution containing a conventional lithium battery adhesive, which is then stirred to obtain a raw slurry of electrode active material. 5% solution of sodium 4,5-dibutyl naphthalene sulphonate as a surfactant is further added in an amount of 0.1% based on the total weight of the electrode active material slurry; then butanol as a dispersant is added in an amount of 5% based on the total weight of the electrode active material slurry; additionally, an electrical conductive agent is added in an amount of 5% based on the total weight of the electrode active material slurry; and after the resultant product is sufficiently agitated to be uniform, a uniform and stable raw slurry dispersed with the electrode active material is obtained, the viscosity thereof being 1000 centipoises;

b) The uniform and stable slurry dispersed with the electrode active material prepared in step a) is centrifugally filtered, so as to control the particle sizes of the electrode active material in the slurry thereof at 25 μm to obtain a fine slurry, the viscosity thereof being 1000 centipoises;

c) Preparation of gel electrolyte pre-coating slurry: a polyurethane monomer (gel-polymeric monomer) is dissolved in a solution of tetrahydrofuran to obtain a solution having a concentration of 3% by mass; a formaldehyde curing agent having a concentration of 0.1 mol/L is added; and then an LiPF6 electrolyte having a concentration of 1 mol/L is added in an amount of 75% by weight of the polyurethane monomer; after agitating and filtering, a uniform precoating slurry of gel polymer is obtained; and d) The precoating slurries prepared in steps b) and c) are coated onto a surface of a composite film of mental foil current collector and polyester by a two-layer one-step coating process to obtain a two-layer structural coating of the gel electrolyte/the electrode active material. The coating speed is controlled at 75 m/min and the thickness of the coating is controlled at 50 μm. The coating is passed through a horizontal channel drier at 60° C. for 20 minutes, so as to cure and dry the gel polymer electrolyte to obtain a composite electrode coating of the electrode active material and the gel polymer electrolyte.

While the present invention has been illustrated by the above examples, it should be understood that the examples are only provided for the purpose of illustration and description, and it is not intended to limit the invention to the scope of the described examples. In addition, those skilled in the art can understand that the present invention is not limited to the above examples, and that more modifications and variations can be made according to the teachings of the present invention, and that such modifications and changes also fall within the scope of protection which the invention claims. The scope of protection is defined by the appended claims and their equivalents.

What is claimed is:

1. A method of preparing a gel polymer Li-ion battery electrode slice, characterized in that the electrode slice comprises a two-layer composite structure of electrode active material/gel electrolyte or a three-layer composite structure of electrode active material/gel electrolyte/electrode active material, and the method includes the following steps:
   a) grinding an electrode active material, and adding an adhesive, a surfactant, a dispersant, an electrical conductive agent and a solvent for Li-ion battery electrode material thereto to obtain a raw slurry of the electrode active material;
   b) filtering the raw slurry of the electrode active material to obtain a uniform, fine precoating slurry;
   c) dispersing a monomer, a curing agent and an electrolyte of a gel polymer electrolyte into a solvent, and filtering the resultant dispersion to obtain a precoating gel electrolyte slurry;
   d) coating directly the precoating slurries obtained in steps b) and c) on a composite film of current collector and polyester by a multi-layer one-step coating process to obtain a battery electrode coating of a two-layer composite structure of electrode active material/gel electrolyte or of a three-layer composite structure of electrode active material/gel electrolyte/electrode active material;
   e) as to the battery electrode coating obtained in step d), using an oven or a horizontal channel drier to cure the polymeric monomer and dry the whole battery electrode coating, the drying temperature being 20-100° C., and the drying time being 10 seconds to 100 minutes.

2. The method according to claim 1, characterized in that the adhesive in step a) is one selected from polyurethane, polytetrafluoroethylene and polyvinylidene fluoride, or a mixture thereof.

3. The method according to claim 1, characterized in that the electrical conductive agent accounts for 0.1-10% based on the weight of the whole slurry in step a).

4. The method according to claim 1, characterized in that the surfactant in step a) comprises one selected from sodium 4,5-dibutyl naphthalene sulphonate, sodium di-iso-octyl sulfosuccinate, sodium dodecyl sulphonate and sodium lauryl benzene sulphonate, or a mixture thereof.

5. The method according to claim 1, characterized in that the dispersant in step a) is one selected from ethanol, propanol, butanol and tetrahydrofuran, or a mixture thereof.

6. The method according to claim 1, characterized in that the filtering in step b) is one selected from pressure filtration, vacuum filtration, centrifugal filtration and polymer filtration, or a combination thereof, and the particle sizes of solid particles in the slurry after filtering are controlled to 20 nm to 50 μm.

7. The method according to claim 1, characterized in that the polymer electrolyte monomer in step c) is a compound comprising a polar radical functional group C=O, C=N or C—O.

8. The method according to claim 7, characterized in that the polymer electrolyte monomer in step c) is a polyurethane monomer.

9. The method according to claim 1, characterized in that the curing agent in step c) is an aldehydic curing agent.

10. The method according to claim 9, characterized in that the aldehydic curing agent in step c) is a formaldehyde curing agent.

11. The method according to claim 1, characterized in that the electrolyte selected in step c) is one or two selected from $LiPF_6$ and $LiClO_4$.

12. The method according to claim 1, characterized in that the coating in step d) is one selected from blade coating, reversal roller coating and extrusion coating, a coating speed being 10-150 m/min, a thickness of coating being 3-300 μm.

13. The method according to claim 1, characterized in that the viscosity of the precoating slurry of electrode active material in step b) is 40-5000 centipoises.

14. The method according to claim 1, characterized in that the viscosity of the precoating gel polymer electrolyte slurry in step c) is 50-5000 centipoises.

* * * * *